United States Patent
Boehler et al.

(10) Patent No.: US 7,925,685 B2
(45) Date of Patent: Apr. 12, 2011

(54) DRIVER FOR A FUNCTION UNIT PARAMETRIZED BY A NUMBER OF INPUT VARIABLES

(75) Inventors: Bert Boehler, Neunkirchen a. Br. (DE); Jean-Marie Clement, Erlangen (DE); Thomas Hildebrand, Moehrendorf (DE); Marc Rose, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1427 days.

(21) Appl. No.: 11/376,242

(22) Filed: Mar. 16, 2006

(65) Prior Publication Data
US 2006/0229747 A1 Oct. 12, 2006

(30) Foreign Application Priority Data
Mar. 17, 2005 (DE) .......... 10 2005 012 385

(51) Int. Cl.
*G06F 7/38* (2006.01)
*G06F 19/00* (2011.01)
(52) U.S. Cl. ........... 708/290; 700/189
(58) Field of Classification Search ........... 708/290, 708/313
See application file for complete search history.

(56) References Cited

U.S. PATENT DOCUMENTS

| 3,882,304 A * | 5/1975 | Walters ............ 700/163 |
| 6,434,465 B2 | 8/2002 | Schmitt et al. |
| 2005/0035562 A1 | 2/2005 | Meier et al. |

FOREIGN PATENT DOCUMENTS

| DE | 199 30 598 A1 | 7/1999 |
| DE | 199 63 213 A1 | 12/1999 |
| DE | 103 36 441 A1 | 8/2003 |
| EP | 0 164 945 B1 | 6/1991 |
| WO | WO 2004/102291 A1 | 5/2004 |

* cited by examiner

*Primary Examiner* — Chuong D Ngo
(74) *Attorney, Agent, or Firm* — Harness, Dickey & Pierce, P.L.C.

(57) ABSTRACT

A control system, a method of operating the same, and a method for setting up the same are disclosed for simplified driving of a function unit parametrized by a plurality of input variables. The control system includes a setting unit and a control unit, the setting unit being used to set a number of prescribed control parameters and to feed them to the control unit. A value tuple that is fed to the function unit for the parametrization thereof is determined by the control unit as a function of the controlled variables in accordance with a stored interpolation function based on interpolation points. To set up the control system, it is provided to select a number of value tuples of the input variables as interpolation points from a parameter space defined by the input variables, and to determine the interpolation function in such a way that it defines a continuous subspace of the parameter space which has a dimensionality corresponding to the number of controlled variables and contains every interpolation point.

12 Claims, 2 Drawing Sheets

DRIVER FOR A FUNCTION UNIT PARAMETRIZED BY A NUMBER OF INPUT VARIABLES

The present application hereby claims priority under 35 U.S.C. §119 on German patent application number DE 10 2005 012 385.6 filed Mar. 17, 2005, the entire contents of which is hereby incorporated herein by reference.

FIELD

The invention generally relates to a method for setting up a control system for driving a function unit that is parametrized by a plurality of input variables. The invention also generally relates to such a control system and/or to a method for driving a function unit by using the control system.

BACKGROUND

Properties of a complex technical system (denoted in general below as "function unit") can frequently be stipulated by a multiplicity of input variables, that is to say in a multidimensional parameter space. It is often difficult and wearisome for the user to find a suitable value combination (also denoted below as "control state" or "value tuple") in such a parameter space, the more so as the number of possible control states, and the dimensionality of the parameter space, increases as a power of the dimensionality of the parameter space, and the interaction of the individual input variables with regard to the resulting behavior of the function unit often cannot be predicted by the user, particularly given a lack of experience.

Here, the function unit can be both a hardware component and a software component.

An example of such a function unit is, in particular, a software module for calculating the attractiveness of illumination of a virtual object in a three-dimensional display, in particular a so-called raytracing software. Such attractiveness of illumination is used, inter alia, in imaging medical technology in order to display realistically a three-dimensional recording of a body structure obtained, for example, by a tomographic method. Such attractiveness of illumination is parametrized, for example, by input variables that specify the intensity of the ambient light, of the diffuse reflection, of the specular reflection or of the gloss of the object to be imaged. Here, the overwhelming majority of possible control states lead as a rule to an undesirable image impression. By contrast, only a very few control states supply a satisfactory result.

A further example of such a function unit is a software package for coloring a three-dimensional volume display (VRT—volume rendering). Such methods are, in turn, frequently used in imaging medical technology in order to display three-dimensionally recorded body structures. Here, input variables in particular specify color components of red, green and blue that can be mixed by the function unit to produce a high number of possible final colors. Only very few color mixtures thereby lead in turn to a realistic color impression of a displayed body structure such as is usually desired by a medical practitioner. These "realistic" colors are, moreover, occasionally distributed irregularly in the available color spectrum.

Hardware-based examples of function units are a complex tone mixer console with a multiplicity of tone and/or frequency channels that can be combined to form an overall tone, or the control device of a complex lighting system.

In hardware-based function units, the setting of the input variables is frequently performed by way of a number of mechanical regulators (linear regulators, rotary regulators, etc.), of which each is assigned to an input variable. Particularly in the case of software-based function units, it is mostly graphic simulations of mechanical regulators within the user interface of a software program, or alphanumeric input fields that are provided for setting the input variables. In both cases, the user must search for a suitable setting for each input variable individually.

Consequently, a list of frequently used value combinations (so-called presets) is made available to the user for simplified parametrization of such a function unit. In the case of a color selection module, such a preset list includes, for example, value combinations for a number of standard colors.

Such a discrete value list leads to a significant simplification of the parametrizing process particularly when only a few selection possibilities are prescribed. As a result, however, the freedom of choice of a user to set an individual result is necessarily restricted. On the other hand, if a large quantity of possible value combinations is prescribed, this in turn necessarily complicates the selection process.

SUMMARY

It is an object of at least one embodiment of the invention to specify a method for driving a function unit, and an associated control system that permits a user to parametrize the function unit in a particularly intuitive, simple and rapid fashion. It is also an object of at least one embodiment of the invention to specify a method that is particularly suitable for setting up such a control system.

With reference to the method for setting up the control system, an object may be achieved according to at least one embodiment of the invention. It is provided thereby firstly to select a plurality of value tuples (that expediently correspond to "sensible" control states) as interpolation points inside a parameter space that is defined by the input variables of the function unit to be parametrized. These interpolation points are then used to determine an interpolation function that depends on a number of controlled variables and is designed in such a way that it images every value tuple of the controlled variables uniquely onto a value tuple of the input variables. The interpolation function is, moreover, determined in such a way that it (as value range) defines a continuous subspace of the parameter space defined by the input variables, the subspace corresponding in terms of dimensionality to the number of controlled variables, and containing every interpolation point.

Any desired control state, that is to say any desired combination of in each case one value for each input variable is denoted as "value tuple of the input variables". Any desired combination of in each case one value for each controlled variable is correspondingly denoted as "value tuple of the controlled variables".

The set of all possible value tuples of the input variables is denoted as "parameter space". The dimensionality of the parameter space corresponds here to the number of the input variables. For N=2, 3, . . . input variables, the parameter space is therefore N-dimensional. The subspace is any desired subset of the parameter space with the dimensionality M=1, 2, . . . corresponding to the number of the controlled variables. The term "space" describes in general a one- or multidimensional space in the mathematical sense, in particular a line, a surface, a 3D space, etc. Likewise, the term "volume" is to be understood in a fashion spanning the dimensions as the content of the associated space, that is to say as the length of a line, the area of a surface, 3D volume of a 3D space, etc.

With reference to the controlled variables, the term "number" here also includes, in particular, the limiting case M=1, which is even preferred according to at least one embodiment of the invention. In this limiting case, only a single controlled variable is provided. The subspace in this case forms a line (straight or curved) within the parameter space. This variant provides a particularly simple control system that can be operated intuitively, the more so as the user can "cover" all the relevant value tuples by varying the single controlled variable. The setting-up method based on interpolation points here enables a particularly effective optimization of the control system with regard to the relevant control states, which can be carried out simply for any desired complex distribution of these control states in the parameter space.

As an alternative to this, however, it is also advantageous in specific situations for several controlled variables to be present. It is preferred here to determine a number of controlled variables that falls below the dimensionality of the parameter space such that a comparatively high-dimensional parameter space is reduced in turn to a comparatively low-dimensional subspace. Given a comparatively large setting freedom for the user, this "downward dimensioning" nevertheless yields a substantial simplification in the outlay on parametrization. In individual cases, however, it is also advantageous to prescribe a number of controlled variables corresponding to the number of the input variables, for example M=N. It is possible thereby, in particular, to "defuse" a complex interaction of a number of input variables that can easily be intuitively detected.

In a particularly simple method variant that can be used flexibly, the interpolation function is determined by firstly stipulating the subspace inside the parameter space with the aid of the selected interpolation points. This is preferably done by way of a mathematical method in the case, in particular, of a high dimensionality of the parameter space. However, particularly in the case of a two- or three-dimensional parameter space, the subspace can also alternatively be stipulated manually, for example by joining the interpolation points by hand with a line or surface.

Once the subspace has been stipulated, a coordinate corresponding to the controlled variable is stipulated for each dimension of the subspace. In the case of a one-dimensional subspace, this step is restricted to the selection of a coordinate direction, since the subspace trivially prescribes the course of the single coordinate axis in the parameter space. In the case of a two- or multidimensional subspace, a corresponding coordinate system therein stipulates, in particular, the position, shape and direction of the coordinate axes.

It is possible here to make use of any desired coordinate system, in particular Cartesian coordinates, polar coordinates, cylindrical coordinates, spherical coordinates, curvilinear coordinates, etc. These coordinates are dimensioned in a further step, that is to say they are provided with a value scale of the respectively corresponding controlled variable. This is performed in a particularly simple and flexible way by stipulating for each coordinate a progress function by which each value of the associated controlled variable is allocated a point along the coordinate.

This method advantageously permits the definition of nonlinear progress functions in the case of which a variation in the controlled variable is not proportional to a position charge on the coordinate axis. A nonlinear progress function can be used to adapt the controlled variables with particular flexibility to the specific requirements when driving the function unit. For example, an unproductive region of the parameter space can simply be "skipped" by a step provided at an appropriate point in a progress function.

A spline interpolation, in particular, is used as mathematical method for determining the subspace inside the parameter space. A polynomial of piecewise definition and that is continuous, in particular also continuously differentiable, is denoted as spline. Alternatively or in addition, use is preferably made, as mathematical method for stipulating the subspace, of a volume minimization algorithm that minimizes the M-dimensional volume of the subspace under the secondary condition that all the interpolation points must be contained in the subspace. Such volume minimization methods are used, for example, in architecture for the purpose of calculating minimum surfaces (simulation of soap film figures). If the subspace includes more than one dimension, the associated controlled variables are preferably allocated orthogonal coordinates.

With reference to the method for driving the function unit, an object may be achieved according to at least one embodiment of the invention. According thereto, a value is firstly set for each prescribed controlled variable. The value tuple of the controlled variables that has thus been produced is then used to determine a value for each input variable in accordance with the above-described interpolation function, which value is led to the function unit.

With reference to the associated control system, an object may be achieved according to at least one embodiment of the invention. The control system comprises a setting unit by means of which a value can be specified for each controlled variable. The setting unit here includes, in particular, a number of virtual or mechanical regulators that corresponds to the number of the controlled variables. The control system also includes a control unit in which the interpolation function is implemented.

BRIEF DESCRIPTION OF THE DRAWINGS

Example embodiments of the invention are explained below in more detail with the aid of the drawings, in which.

Mutually corresponding parts and sizes are always provided with the same reference numerals in all the figures.

DETAILED DESCRIPTION OF THE EXAMPLE EMBODIMENTS

Figure 1:
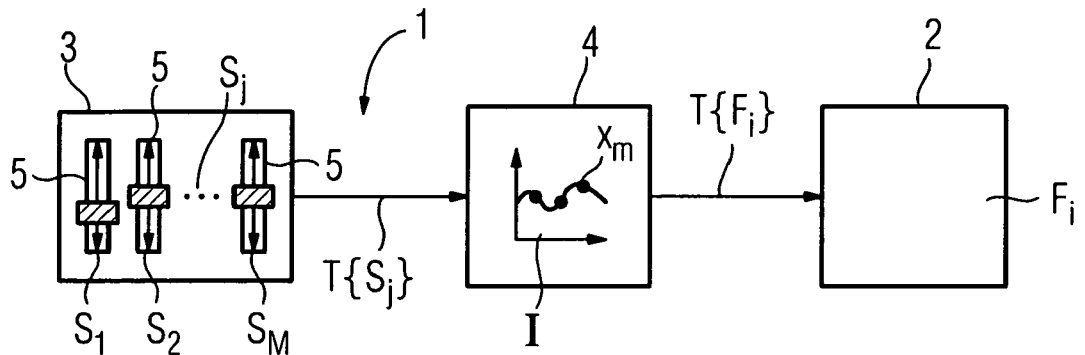
FIG. 1 shows a schematic block diagram of a control system for driving a function unit parametrized by a plurality N=2, 3, 4, ... of input variables, having a setting unit by which a number M (M=1, 2, ...,N) of controlled variables can be set, and having a control unit that is designed for the purpose of stipulating the input variables of the function unit as a function of the controlled variables with the aid of a stored interpolation function.

FIG. 1 shows a control system 1 for driving a function unit 2. The function unit 2 is parametrized by a plurality N(N=2, 3, 4, . . . ) of input variables $F_i$(i=1, 2, . . . ,N), that is to say it is respectively necessary to stipulate a value for each input variable $F_i$ in order to operate the function unit 2.

The function unit 2 is, in particular, a software module for calculating an attractiveness of illumination for a virtual three-dimensional object in a virtual three-dimensional environment. In this case, the function unit 2 is parametrized by four proportionality functions as input variables $F_i$ that specify the intensity of the ambient light, the diffuse reflection, the specular reflection or the gloss of the object in a value range between 0% and 100% in each case.

As an alternative, the function unit 2 is a software module for color selection for a virtual three-dimensional object in a volume display program. In this case, the function unit 2 is parametrized by three input variables $F_i$ that specify the proportionality factors of the color components of red, green and blue, again in a value range from 0% to 100% in each case.

Once more as an alternative, the function unit 2 is a tone mixer console having a multiplicity of tone channels of which each in turn is assigned an input variable $F_i$ that specifies a proportionality factor with the aid of which the assigned tone channel contributes to an overall tone. A further example for such a function unit 2 is a complex illumination system in which various light sources can be driven in a differential fashion in accordance with a respectively assigned input variable $F_i$.

The input variables $F_i$ are determined within the framework of the control system 1, described below, in accordance with a number M (M=1, 2, . . . ,N) of controlled variables $S_j$(j=1, 2, . . . ,M).

The control system 1 comprises a setting unit 3 and a control unit 4. The setting unit 3 includes a number of regulators 5, each of which is assigned a controlled variable $S_j$, and by means of which a value is stipulated for the assigned controlled variable $S_j$. The setting unit 3 outputs a value tuple $T\{S_j\}$ of the controlled variables $S_j$ to the control unit 4.

Stored in the control unit 4 is an interpolation function I that is based on interpolation points and images the controlled variables $S_j$ mathematically onto the input variables $F_i$. In other words, the interpolation function I allocates each value tuple $T\{S_j\}$ of the controlled variables $S_j$ a corresponding value tuple $T\{F_i\}$ of the input variables $F_i$. The control unit 4 outputs the determined value tuple $T\{F_i\}$ to the function unit 2.

Properties of the interpolation function I and a method for producing the same are illustrated below with the aid of two simplified examples in accordance with FIG. 2 and FIG. 5, respectively. For technical illustration reasons, the starting point here is a function unit 2 that is parametrized only by two input variables $F_1$ and $F_2$.

Figure 2:
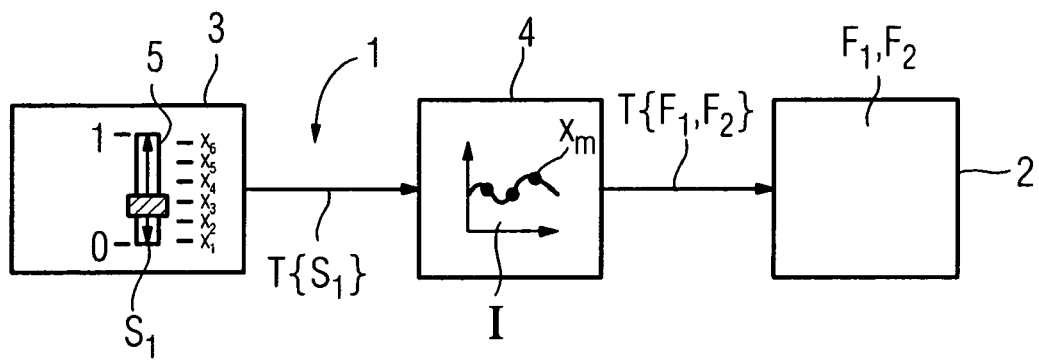
FIG. 2 shows a first design of the control system for M=1 and N=2, in an illustration in accordance with FIG. 1.

FIG. 2 shows a first embodiment of the control system 1 in the case of which the function unit 2 is driven with the aid of a single controlled variable $S_1$. The setting unit 3 correspondingly includes only a single regulator 5, and the value tuple $T\{S_1\}$ only a single value assigned to the controlled variable $S_1$.

Figure 3:
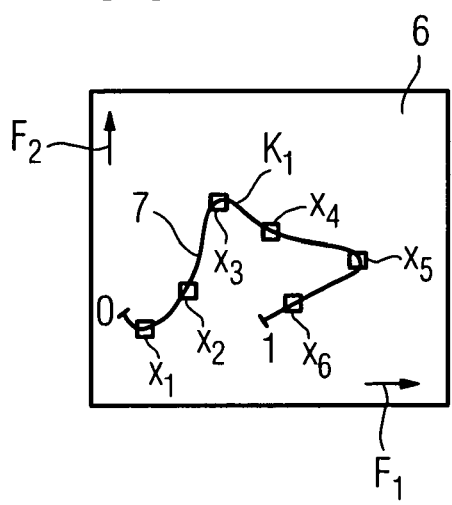
FIG. 3 shows a schematic illustration of a parameter space defined by the input variables and having a one-dimensional subspace defined by the interpolation function.

In order to produce the interpolation function I, according to FIG. 3 the first step is to select as interpolation points $x_m$(m=1, 2, 3, . . . ) inside a parameter space 6 that is defined by the input variables $F_1$ and $F_2$ and correspondingly includes the set of all possible value tuples $T\{F_1, F_2\}$, a number of such value tuples $T\{F_1, F_2\}$. It is, in particular, value tuples $T\{F_1, F_2\}$ that correspond to a control state empirically suitable with regard to the behavior of the function unit 2 which are selected. In the case of attractiveness of illumination in terms of medical technology, the selected interpolation points $x_m$ reproduce a naturally attractive reflective behavior of organic material under various conditions of illumination. In the case of a color selection module, the interpolation points $x_m$ represent a selection of naturally attractive colors of organic material, etc.

The interpolation points $x_m$ are in this case optionally assigned a sequence by hand. These are also optionally determined automatically. The sequence of the interpolation points $x_m$ illustrated in FIG. 3 is reproduced by the counting index m, for example.

After stipulation of the interpolation points $x_m$, a subspace 7 that includes all the interpolation points $x_m$ in the prescribed sequence is stipulated inside the parameter space 6. The subspace 7 in this case has a dimensionality corresponding to the number M of the controlled variables $S_j$. That is to say, in the present case the subspace 7 is one-dimensional and therefore forms a line inside the parameter space 6 on which all the interpolation points $x_m$ are "strung". The form of the subspace 7 can optionally be determined here manually or by a mathematical algorithm.

The subspace 7 is preferably calculated by a so-called spline interpolation, in particular by using cubic splines. Alternatively, a method is used that minimizes the form of the subspace 7 iteratively or analytically with minimization of the M-dimensional volume, that is to say the length of the subspace 7, in the present case. If appropriate, further secondary conditions, in particular the simultaneous minimization of the average curvature, ensure that the subspace 7 is continuously differentiable.

After stipulation of the subspace 7, a coordinate system describing the latter is defined. In particular, a number of coordinates $K_j$(j=1, 2, . . . ,M) is stipulated that corresponds to the dimensionality of the subspace 7. In the case of the one-dimensional subspace 7 in accordance with FIG. 3, the form of the single coordinate $K_1$ is prescribed trivially by the subspace 7 itself. All that need be done is to prescribe a coordinate direction. The coordinate direction is determined here, in particular, by the sequence of the interpolation points $x_m$.

In order to correlate the controlled variable $S_1$ with the coordinate $K_1$, an associated progress function $P_j$ (j=1, 2, . . . ,M) is further specified. The associated progress function $P_1$ is illustrated by way of example in FIG. 4 for the coordinate $K_1$ and the associated controlled variable $S_1$. The progress function $P_1$ is selected, in particular, to be nonlinear.

Figure 4:
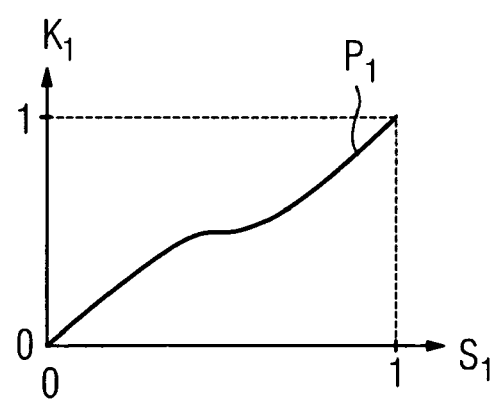
FIG. 4 shows a schematic diagram of a progress function that forms a component of the interpolation function in accordance with FIG. 1 and by which the controlled variable is imaged onto the single coordinate of the subspace in accordance with FIG. 3.

FIGS. 3 and 4 together contain the information stored in the interpolation function I. In particular, it is possible to use the progress function $P_1$ to derive for each value of the controlled variable $S_1$ a value of the coordinate $K_1$ by which it is possible, in turn, to determine from FIG. 3 a point in the subspace 7, and thus a value tuple $T\{F_1, F_2\}$ of the parameter space 6. By displacing the regulator 5 between the extreme positions, a user of the control system 1 is able to adjust the controlled variable $S_1$ between the value 0 and the value 1, and thus to cover continuously along the coordinate $K_1$ all the control states of the input variables $F_1$ and $F_2$ predefined by interpolation points $x_m$.

The interpolation function I is optionally stored in the control unit 4 in the form of the coordinate $K_j$ and the associated progress functions $P_j$. In a fashion equivalent thereto, after the interpolation function I has been set up, a value table, characteristic curve or model function, which reproduces the dependencies shown in FIGS. 3 and 4, is calculated with the aid of the progress functions $P_j$ and the coordinate $K_j$. In the latter case, only that value table, characteristic curve or model function is stored in the control unit 4.

Figure 5:
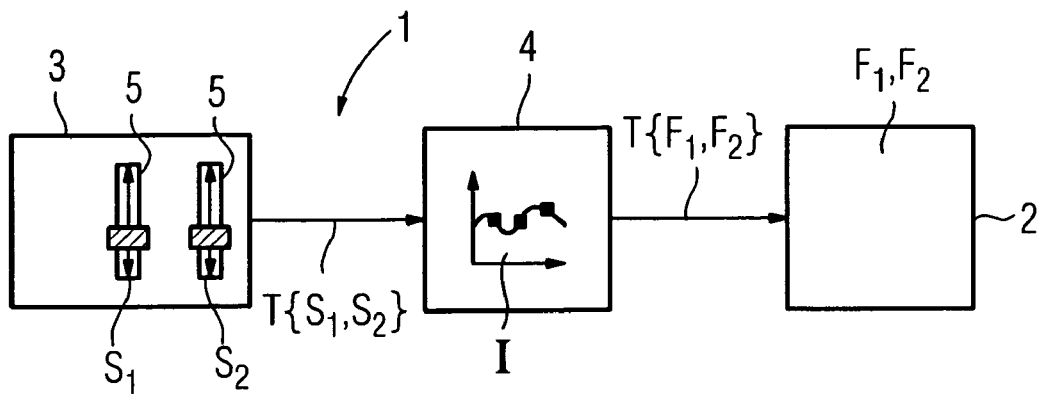
FIG. 5 shows, in an illustration in accordance with FIG. 1, a further embodiment of the control system for M=2 and N=2.

The example embodiment of the control system 1 illustrated in FIG. 5 differs from the example embodiment described above in that the setting unit 3 can set two controlled variables $S_1$ and $S_2$.

Figure 6:
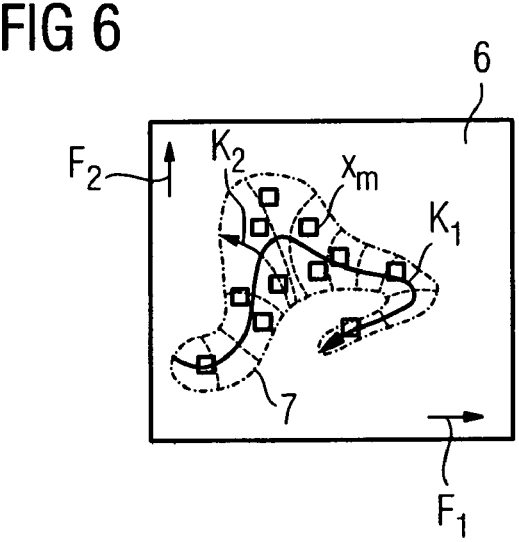
FIG. 6 shows, in an illustration in accordance with FIG. 3, the parameter space having a two-dimensional subspace defined by the interpolation function in accordance with FIG. 5.

In accordance with FIG. 6, suitable interpolation points $x_m$ are firstly selected, in turn, and a suitable subspace 7 is stipulated with reference to these interpolation points $x_m$ in order to set up the interpolation function I which, in this case, images the two controlled variables $S_1$, $S_2$ onto the two input variables $F_1$, $F_2$. The subspace 7 is two-dimensional in this case, and therefore forms a surface inside the parameter space 6.

Defined, in turn, in this subspace 7 is a coordinate system that now comprises a first coordinate $K_1$ assigned to the controlled variable $S_1$, and a second coordinate $K_2$ assigned to the controlled variable $S_2$. The coordinate system $K_1$, $K_2$ is preferably produced automatically. Particularly in the case of an irregularly formed subspace 7 such as is illustrated by way of example in FIG. 6, the coordinates $K_1$ and $K_2$ are preferably erected as a curvilinear orthogonal coordinate system that is adapted to the geometry of the subspace 7. A coordinate system is denoted as orthogonal when the coordinates $K_1$ and $K_2$ are at right angles to one another at each point in the subspace 7.

Figure 7:
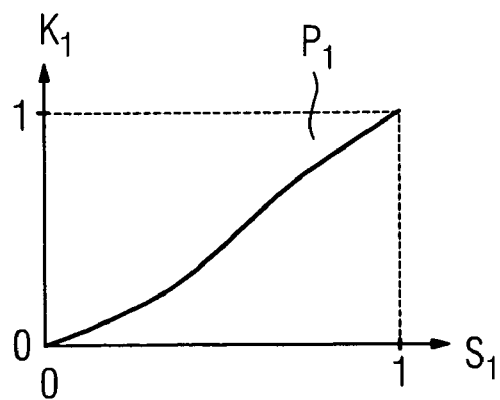
FIG. 7 shows, in an illustration in accordance with FIG. 4, a progress function assigned to a first coordinate of the subspace in accordance with FIG. 6.
Figure 8:
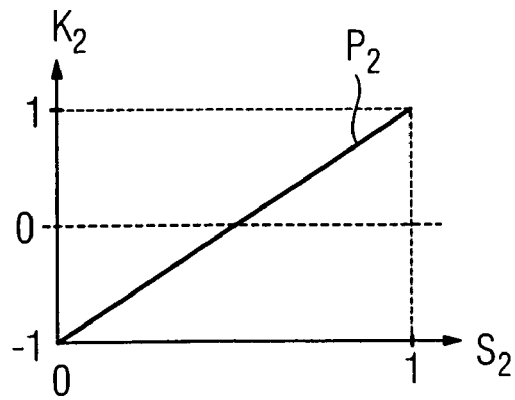
FIG. 8 shows, in an illustration in accordance with FIG. 4, a progress function assigned to a second coordinate of the subspace in accordance with FIG. 6.

In accordance with FIGS. 7 and 8, a progress function $P_1$ or $P_2$ is prescribed, in turn, in each case for each coordinate $K_1$, $K_2$. The progress function $P_1$, which in accordance with FIG. 7 connects the coordinate $K_1$ to the associated controlled variable $S_1$, is in turn selected to be nonlinear, while the progress function $P_2$ which correlates the coordinate $K_2$ with the controlled variable $S_2$ is selected to be linear.

The setting-up principle described above can be applied beyond the examples illustrated to any desired plurality N of input variables $F_i$ and to any desired number M of prescribed controlled variables $S_j$.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for setting up a hardware based control system for a hardware based function unit, said function unit being parametrized by a plurality of input variables, said control system including a setting unit and a control unit, said setting unit including at least one regulator, the method comprising:
   selecting a plurality of value tuples of the plurality of input variables as interpolation points from a parameter space defined by the plurality of input variables;
   determining an interpolation function that is dependent on at least one control variable and defines a continuous subspace of the parameter space, the subspace having a dimensionality corresponding to a number of the at least one control variables and contains every interpolation point;
   assigning the at least one control variable to the at least one regulator of the setting unit such that a value of the at least one control variable is stipulated by means of the respective regulator; and
   storing the interpolation function in the control unit, wherein the interpolation function is determined by,
   stipulating the subspace inside the parameter space,
   stipulating, for each dimension of the subspace, a coordinate corresponding to the at least one control variable, and
   stipulating for each coordinate, a progress function by which each value of the associated at least one control variable is allocated a value of the coordinate.

2. The method as claimed in claim 1, wherein the subspace is stipulated by applying a spline interpolation to the interpolation points.

3. The method as claimed in claim 2, wherein at least two control variables are included, to which orthogonal coordinates are allocated.

4. The method as claimed in claim 2, wherein at least one progress function is nonlinear.

5. The method as claimed in claim 1, wherein the subspace is stipulated by applying a volume minimization algorithm.

6. The method as claimed in claim 1, wherein at least two control variables are included, to which orthogonal coordinates are allocated.

7. The method as claimed in claim 1, wherein at least one progress function is nonlinear.

8. A computer program product comprising a non-transitory computer useable recording medium having computer readable program codes embodied in the medium that, when executed on a computer, cause the computer to carry out the method as claimed in claim 1.

9. A method for driving a hardware based function unit that is parametrized by a plurality of input variables, the method comprising:
   setting, using a setting unit, a value for at least one prescribed control variable, said setting unit including a plurality of regulators, each regulator being assigned a respective prescribed control variable of a plurality of control variables;
   feeding the set value of each control variable to a control unit; and
   determining, using the control unit and as a function of the set value of each control variable, a value for each input variable in accordance with a stored interpolation function and feeding the value to the function unit, the interpolation function defining a continuous subspace of a parameter space defined by the input variables, the continuous subspace including a plurality of prescribed interpolation points, wherein the interpolation function is determined by, stipulating the subspace inside the parameter space, stipulating, for each dimension of the subspace, a coordinate corresponding to said each control variable, and stipulating for each coordinate, a progress function by which each value of the associated control variable is allocated a value of the coordinate.

10. A computer program product comprising a non-transitory computer useable recording medium having computer readable program codes embodied in the medium that, when executed on a computer, cause the computer to carry out the method as claimed in claim 9.

11. A hardware based control system for driving a hardware based function unit parametrized by a plurality of input variables, comprising:

a setting unit including a plurality of regulators each of which is assigned a respective one of a plurality of prescribed control variables, each regulator setting a value of the assigned control variable; and a control unit configured to store an interpolation function and designed to determine a value for each input variable as a function of each control variable in accordance with the stored interpolation function, and to feed the determined value to the function unit, the interpolation function defming a continuous subspace of a parameter space defined by the plurality of input variables, the continuous subspace including a plurality of prescribed interpolation points, wherein the interpolation function is determined by, stipulating the subspace inside the parameter space, stipulating, for each dimension of the subspace, a coordinate corresponding to said each control variable, and stipulating for each coordinate, a progress function by which each value of the associated control variable is allocated a value of the coordinate.

12. A hardware based control system for driving a function unit parametrized by a plurality of input variables, comprising:

means for setting a value for a plurality of prescribed control variables;

means for storing an interpolation function; and means for determining a value for each input variable as a function of each control variable in accordance with the stored interpolation function, and for feeding the value to the function unit, the interpolation function defining a continuous subspace of a parameter space defined by the plurality of input variables, the continuous space including a plurality of prescribed interpolation points, wherein the interpolation function is determined by, means for stipulating the subspace inside the parameter space, means for stipulating, for each dimension of the subspace, a coordinate corresponding to said each control variable, and means for stipulating for each coordinate, a progress function by which each value of the associated said control variable is allocated a value of the coordinate.

* * * * *